(12) United States Patent
Sturges et al.

(10) Patent No.: US 11,769,915 B2
(45) Date of Patent: Sep. 26, 2023

(54) SYSTEM AND METHOD FOR EXTRACTING RECYCLABLE MATERIAL

(71) Applicant: Virginia Tech Intellectual Properties, Inc., Blacksburg, VA (US)

(72) Inventors: Robert H. Sturges, Blacksburg, VA (US); Zheng Li, Blacksburg, VA (US); Liurui Li, Blacksburg, VA (US); Tairan Yang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 732 days.

(21) Appl. No.: 16/634,338

(22) PCT Filed: Aug. 2, 2018

(86) PCT No.: PCT/US2018/045006
§ 371 (c)(1),
(2) Date: Jan. 27, 2020

(87) PCT Pub. No.: WO2019/028251
PCT Pub. Date: Feb. 7, 2019

(65) Prior Publication Data
US 2020/0243922 A1    Jul. 30, 2020

Related U.S. Application Data

(60) Provisional application No. 62/541,283, filed on Aug. 4, 2017.

(51) Int. Cl.
*H01M 10/54*    (2006.01)
(52) U.S. Cl.
CPC ............ *H01M 10/54* (2013.01); *Y02W 30/84* (2015.05)

(58) Field of Classification Search
CPC ......... H01M 10/54; H01M 6/52; Y02W 30/84
See application file for complete search history.

(56) References Cited

U.S. PATENT DOCUMENTS 4,058,886 A    11/1977  Alvarez
4,306,355 A    12/1981  Hawrylo et al.
(Continued)

FOREIGN PATENT DOCUMENTS

CN    103928727 A  *  7/2014  ............ H01M 10/54
CN    105826629 B  *  5/2018

OTHER PUBLICATIONS

English Translation of CN 105826629 A; All component material separation and collection device and method for waste lithium batteries; Electric power REs Inst of state Grid Henan Electrical Power Co; Aug. 3, 2016 (Year: 2016).*

(Continued)

*Primary Examiner* — Matthew T Martin
*Assistant Examiner* — Adam J Francis
(74) *Attorney, Agent, or Firm* — Blank Rome LLP (57) ABSTRACT

A system and method for extracting recyclable material from an object. The system has a station for receiving the object, a station that prepares the object's cover for removal, a station that removes the cover from the object, a station that positions the object with the cover removed for loading, and a station that has one or more extraction devices configured to engage the object and remove the recyclable material therefrom and has one or more collection areas for receiving the removed recyclable material.

19 Claims, 8 Drawing Sheets

(56) References Cited

U.S. PATENT DOCUMENTS

| | | | |
|---|---|---|---|
| 4,464,830 A | | 8/1984 | Carlsson |
| 5,352,270 A | * | 10/1994 | Shackle .................. C22B 7/006 |
| | | | 423/68 |
| 6,686,086 B1 | | 2/2004 | Martin et al. |
| 6,725,631 B2 | | 4/2004 | Skrak et al. |
| 9,620,790 B2 | | 4/2017 | Deighton |
| 2001/0008723 A1 | * | 7/2001 | Kawakami ............ H01M 10/54 |
| | | | 429/49 |
| 2008/0050295 A1 | * | 2/2008 | Uchida ................... C22B 26/12 |
| | | | 423/179.5 |
| 2013/0298389 A1 | * | 11/2013 | Hohenthanner .. H01M 10/0413 |
| | | | 29/730 |
| 2016/0006072 A1 | * | 1/2016 | Cho .................. H01M 10/0459 |
| | | | 429/138 |

OTHER PUBLICATIONS

English Translation of CN 103928727B; Equipment and method for Dismantling power battery; Guangdong Brunp Recycling Technology Co Ltd; Hunan Brunp Recycling Technology Co Ltd; Apr. 27, 2016 (Year: 2016).*
International Search Report dated Oct. 24, 2018 from PCT/US18/45006.
Written Opinion dated Oct. 24, 2018 from PCT/US18/45006.

\* cited by examiner

SYSTEM AND METHOD FOR EXTRACTING RECYCLABLE MATERIAL

RELATED APPLICATIONS

This application is a national stage application of International Application No. PCT/US2018/045006, filed Aug. 2, 2018, which is related to and claims priority to U.S. Provisional Application No. 62/541,283, filed Aug. 4, 2017, the entire disclosures of which are hereby incorporated by reference.

FIELD OF THE INVENTION

The present invention relates to a system and method for extracting recyclable material from an object, such as batteries or fuel cells.

BACKGROUND

Batteries, such as Li-Ion batteries, are often costly to manufacture because the chemical elements needed for the batteries are in limited supply. And the demand for such batteries is expected to grow dramatically. Therefore, a need exists for a system and method to extract recyclable chemical battery elements, such as cathodes or anodes from sealed stacks of electrodes, to reduce manufacturing costs.

SUMMARY

A system for extracting recyclable material from an object that comprises a first station for receiving at least one object that has recyclable material received in a sealed cover; a second station in communication with the first station to receive the at least one object therefrom and configured to prepare the cover of the at least one object for removal therefrom; a third station in communication with the second station to receive the at least one object therefrom and configured to remove the cover from the at least one object; a fourth station in communication with the third station to receive the at least one object with the cover removed and configured to position the at least one object for loading; and a fifth station in communication with the fourth station to receive the at least one object therefrom. The fifth station may include one or more extraction devices configured to engage the at least one object and remove the recyclable material therefrom and at least one collection area for receiving the removed recyclable material.

In one embodiment, the first, second, third, fourth, and fifth stations have an enclosure with an inert environment for receiving the object.

In another embodiment, the object is one or more battery cells and the recyclable material is electrodes supported by at least one separator web; the fifth station includes another collection area for receiving the at least one separator web for disposal; the fifth station includes at least one movable roller and at least one stationary roller for unfolding or unreeling the at least one separator web; the one or more extraction devices is a blade configured for removing the electrodes from the at least one separator web; the at least one separator web is a serpentine separator web with the electrodes attached to opposite sides thereof; and/or the at least one separator includes a plurality of separator webs with the electrodes attached thereto and wound in a generally spiral configuration.

In certain embodiments, the system has a transport mechanism for moving the at least one object sequentially from the first station to the fifth station; the second station includes one or more trimming devices configured to trim sides of the cover of the at least one object; the third station includes one or more grasping members configured to grasp opposite faces of the cover and remove the cover from the at least one object; the one or more trimming devices are one or more blades and the one or more grasping members are one or more movable vacuum devices; the one or more trimming devices include first and second side blades extending from a front blade, each of the first and second side blades and the front blade being angled to have an angled cutting edge; the cover has a folded end and a sealed end opposite the folded end and first and second sealed sides extending therebetween, and the first and second side blades being configured to cut the first and second sealed sides of the cover and the front blade being configures to cut the front end of the cover; and/or the first and second side blades and the front blade are supporting by a movable support arm.

In other embodiments, the fourth station includes a gripper configured to grip the at least one object; the gripper is movable between different positions in the fourth station; the fourth station includes one or more grasping members configured to grasp the at least one object for loading in the fifth station; the fifth station, one of the one or more grasping members is movable and another of the one or more grasping members is stationary; and/or wherein the one or more grasping members are vacuum devices.

A method of extracting recyclable material from an object, comprising the steps of grouping one or more objects, each object having recyclable material received in a cover wherein the cover is sealed; after grouping the one or more objects, transporting each object individually; after transporting each object individually, preparing each cover of each object for removal; removing each cover from each object; and after removing each cover from each object, extracting the recyclable material from each object.

In some embodiments, the method further comprises the step of collecting the recyclable material after the step of extracting the recyclable material from each object; each object is one or more battery cells and the recyclable material is electrodes supported by at least one separator web, and one or more extracting devices remove the recyclable material from the at least one separator web; the method further comprises the steps of collecting the electrodes and collecting the separator webs; the step of preparing each cover of each object for removal includes moving one or more trimming devices to engage and cut sides of each cover; the step of removing each cover of each object includes grasping opposite faces of each cover and gripping the recyclable material inside of each cover; the step of extracting the recyclable material from each object occurs after gripping the recyclable material and removing each cover; and/or the method further comprises the step of releasing each cover after the step of gripping the recyclable material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Referring to the Figures, the present invention relates to a system and method for extracting recycling material from an object. For example, the present invention may be applied to extracting recyclable electrodes from sealed stacks of battery cells. The present invention is economically advantageous because, for example, one or more of the chemical elements needed to manufacture batteries, particularly Li-Ion batteries, are in limited supply, while the demand for such batteries is expected to grow dramatically in the near future. The present invention also provides for extraction of recyclable materials in a safe manner.

In general, the system of the present invention is configured to receive objects, such as sealed Li-Ion battery cells, individually or in multiples stacked together, and to separate them for further individual processing, such as chemical processing for reclaiming recyclable material like battery electrodes. The system of the present invention may also be configured to remove an outer wrapping or cover of the objects, such as a sealed pouch in which the battery electrodes are sealed from the ambient air. This removal process is preferably carried out in an inert atmosphere because the battery components are known to be reactive in humid air.

The system and method of the present invention is designed to, among other things, (1) separate the individual battery cells by removing the electrode welds which typically join the cells in parallel, without causing arcing between the anodes and cathodes of the cells; (2) separate opposite electrodes from each other and segregate them into storage bins for delivery from the apparatus to the chemical part of the recycling process; (3) remove electrodes from an inert separator web that is either wrapped in a coil, or spiral wound form, or wrapped in a serpentine configuration, since both are known to populate the battery market; (4) be scalable to a variety of lengths, widths and thicknesses of the batteries desired to be recycled such that the system is relatively insensitive to the physical sizes of the cells in batteries; and (5) employ a shape-constraining apparatus when the subject inner battery stacks are removed from their shape-defining outer wraps. These wraps may be in the form of polymer pouches, or other inert packaging.

Figure 1A:
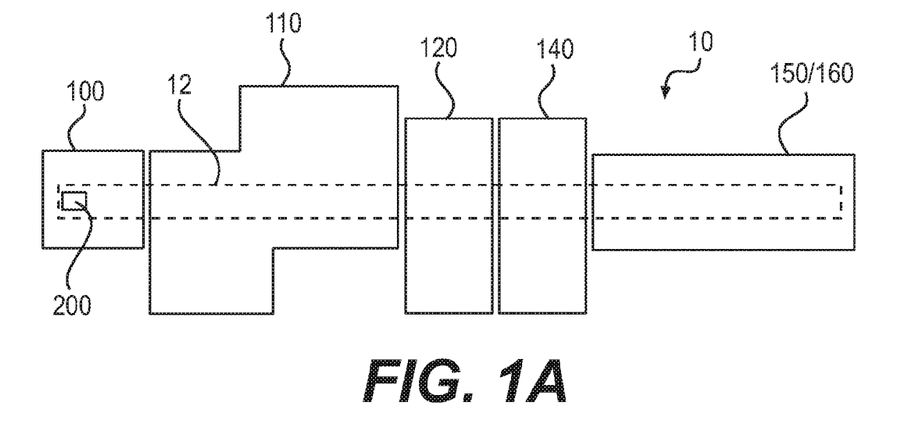
FIGS. 1A and 1B are top plan and front elevational views of a system and method according to an exemplary embodiment the present invention.
Figure 1B:
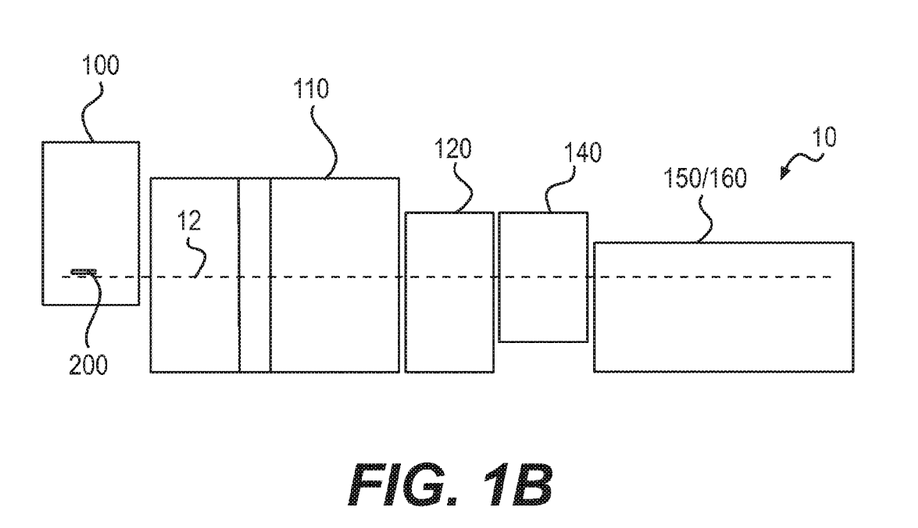

Referring to FIGS. 1A and 1B, the system 10 and method of the present invention may include a number of stations and process steps in communication with one another, including an input or receiving station 100 for receiving and grouping the objects 200, an object cover preparation station 110 to prepare for cover removal, a cover removal station 120, a loading station 140, and a reclamation station 150 or 160 for extracting and collecting recyclable material from the objects 200. The objects 200 are transferred through the system 10 from one station to the next via a transport path 12. Although the path 12 is shown in FIG. 1A as a straight path, the present invention is not limited to a straight transport path and may have jogs and curves suited to particular embodiments. Similarly, in FIG. 1B, the path 12 is shown as a straight horizontal line, but this arrangement is only one of many possible paths. The transport path 12 of the present invention is not restricted to horizontal orientations and could include jogs, turns, return loops, and elevated portions. Also, the stations may be stationary or move with respect to one another.

Figure 2:
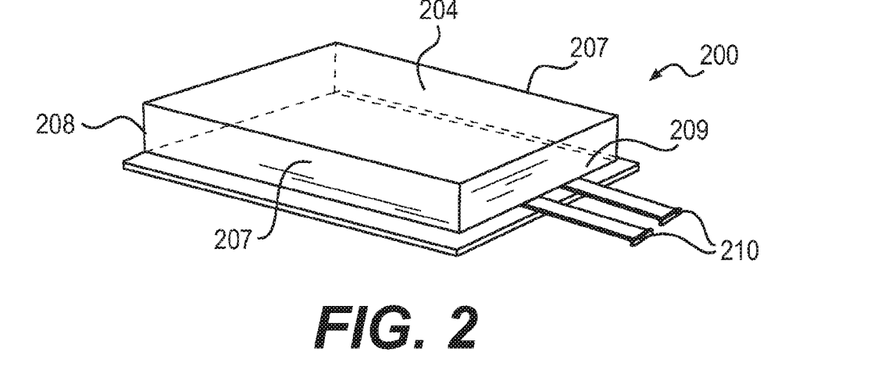
FIG. 2 is perspective view of an exemplary object from which recyclable materials can be reclaimed in accordance with the system and method illustrated in FIGS. 1A and 1B.
Figure 3A:
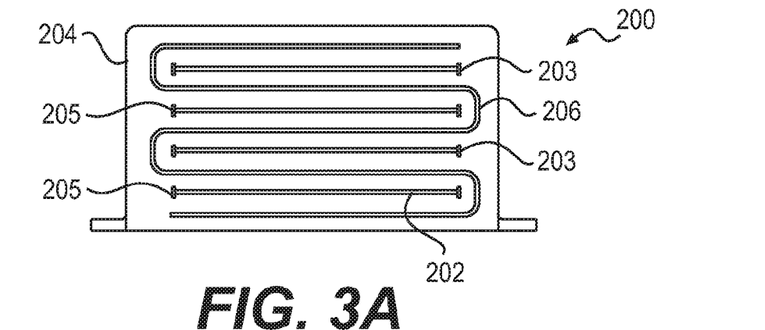
FIG. 3A is a cross-sectional view of an exemplary object from which recyclable material may be extracted in accordance with the present invention, showing a serpentine-wound battery stack with the vertical spacing being exaggerated for clarity.
Figure 3B:
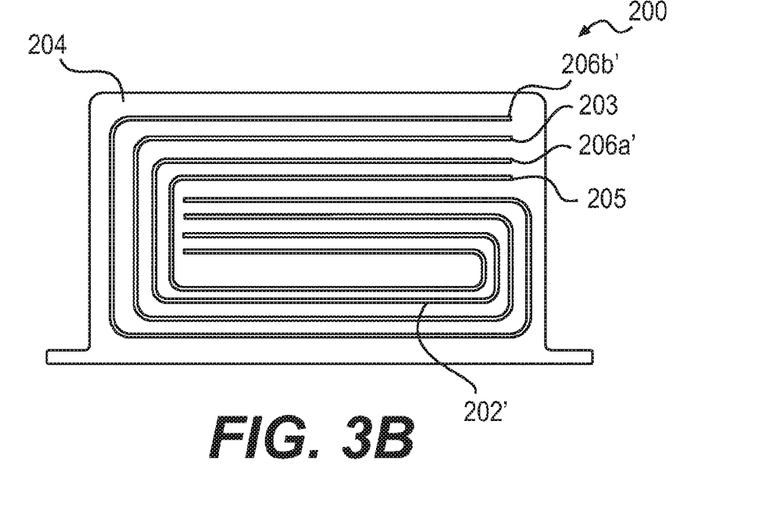
FIG. 3B is a cross-sectional view of another exemplary object from which recyclable material may be extracted in accordance with the present invention, showing a spiral-wound battery stack with the vertical spacing being exaggerated for clarity.

An exemplary object 200 from which recyclable material can be extracted may comprise, for example, a stack 202 or 202' of battery electrodes wound between at least one separating web 206 or webs 206a' and 206b' into which electrolytes are attached or injected during manufacture, as seen in FIGS. 2, 3A, and 3B. Recyclable anodes and cathodes are wound between respective separator webs, one web for each electrode. Both webbing and electrodes may form a continuous ribbon. Each electrode stack 202 is enclosed in a cover 204, such as a pouch, that is preferably heat sealed around the stack 202 to maintain an environment free from ambient air, humidity, water, etc. Each cover or pouch 204 may be folded on one end or edge 208 and may optionally include one or more electrode conductor tabs 210 extending outwards at the other opposite end or edge 209. The two remaining sides 207 of the pouch 204 may be heat sealed after being folded around the stack 202 of electrodes.

The stack of electrodes may be wound one of two ways, such as a serpentine-wound or spiral-wound. FIG. 3A shows a cross-section of an exemplary stack 202 of the serpentine-wound type which has a generally serpentine shaped web 206 with alternative layers of electrodes attached on either side. The electrodes may be individual anodes 203 and cathodes 205, which may be connected by welding at one edge of the pouch. FIG. 3B shows a cross-section of an exemplary stack 202' of the spiral-wound type which has alternative layers of electrodes and lower and upper webs 206a' and 206b' wrapped with the electrode layers in a generally spiral shape. For example, the spiral-wound type stack may include the separator webs 206a' and 206b' with the electrodes attached to each. For example, anodes 203 may be attached to web 206b' and cathodes may be attached to web 206a'.

The object cover preparation station 110 receives the individual objects 200 from input station 100 and delivers the objects 200, with their prepared covers 204, e.g. trimmed and unsealed pouches ready for removal from the objects, to station 120. A waste area can be included for the waste material trimmed from the pouches. The cover removal station 120 removes the object covers 204, for example removes the pouches from the battery electrode stacks within. A waste area may be provided for the waste material of the pouches. Loading station 140 positions each object 200 (with its cover now removed leaving the object's stack 202) for loading into either reclamation station 150 (for serpentine-wound stacks) or reclamation station 160 (for spiral-wound stacks).

Figure 4:
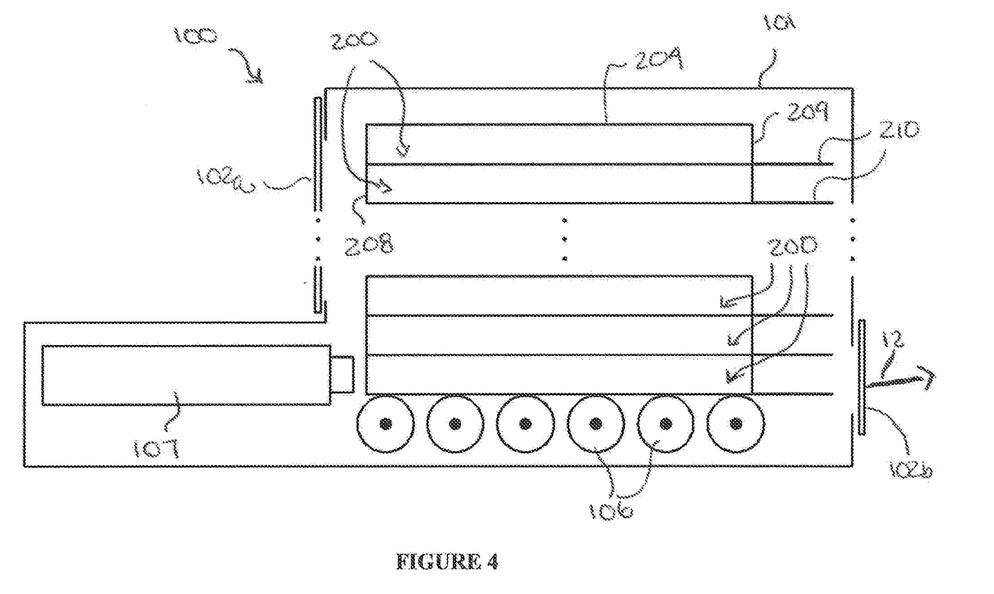
FIG. 4 is an elevational view of an input station of the system and method illustrated in FIGS. 1A and 1B.

Referring to FIG. 4, input or receiving station 100 is shown. Station 100 is preferably enclosed to form a gas tight volume with airlock doors 102a and 102b. With door 102b closed, an operator, or a prior processing station, loads a stack of objects 200 into the enclosure 101 on top of transport rollers 106 or the like. The transport rollers 106 are but one example of a transport device that may be used and/or powered by motors, gears, belts and the like, arranged to provide propulsion to the objects. Each roller 106 may be covered with an elastomer for high friction gripping, or may have a surface that is knurled, geared, covered with a sandpaper member, or the like. The associated drive motors (not shown) and their transmissions to each roller can be configured as is well known in the art. As an alternative to powered transport rollers 106, a pusher device 107 may be used that contacts the bottom-most object 200 of the stacked group of objects and moves it along the path 12. The pusher device 107 may be pneumatic or electrically driven in operation.

The objects 200 in this embodiment may be oriented so that the front edge 209 (with optional tabs 210) which is opposite the folded edge 208 faces toward the direction of travel of path 12. Guides (not shown) may be used to keep the stacked group of objects 200 aligned over the transport rollers 106. When enclosure 101 is loaded with objects, door 102a is closed. The interior of the enclosure 101 is flushed of the ambient air and flooded with an inert gas, preferably nitrogen or the like. Then door 102b is opened and one object 200 is moved, preferably from the bottom of the object stacked group, along path 12 toward station 110.

Figure 5A:
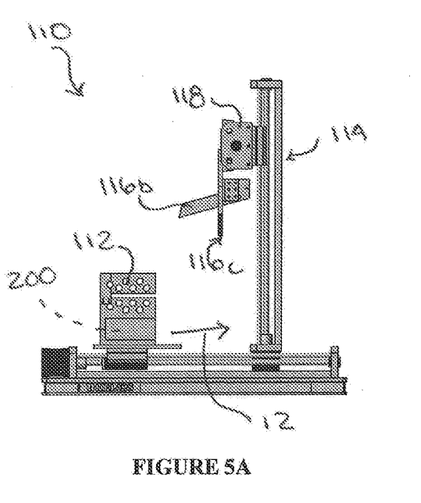
FIGS. 5A thru 5F are front and side elevational views of an object cover preparation station of the system and method illustrated in FIGS. 1A and 1B.
Figure 5B:
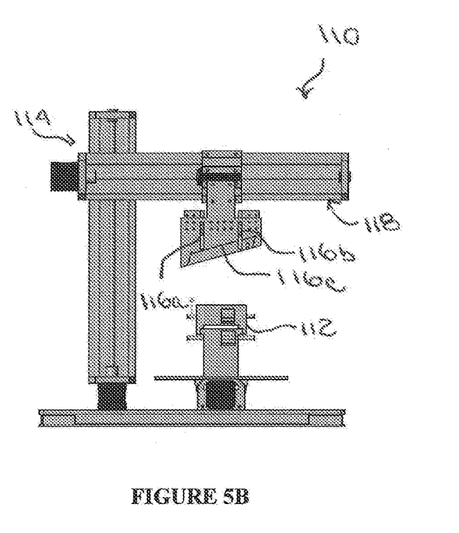

FIGS. 5A-5E illustrate the object cover preparation station 110 and the various positions of the object 200 as it moves through the station 110. Station 110 is configured for preparing the object covers 204 (FIG. 2), e.g. trimming and unsealing, for removal at station 120. Station 110 receives individual objects 200 from station 100 from air lock door 101b, for example, by any known transport mechanism, such as belts, rollers, movable mechanical grippers, and the like. The object 200 is transported along the transport path toward one or more trimming devices 114, as seen in FIGS. 5A and 5B. One or more guides or supports 112 may be used to retain the object 200 and move the same along the transport path 12 in the proper orientation with respect to trimming device 114. Sensors (not shown) may be used to detect the position of the object 200 and adjust the same with respect to the trimming device in concert with the guides 112.

Figure 5C:
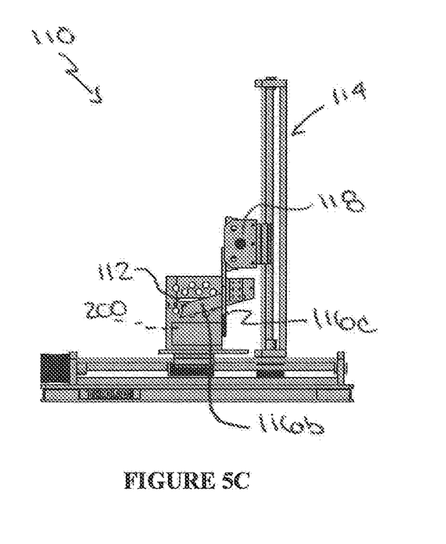
Figure 5D:
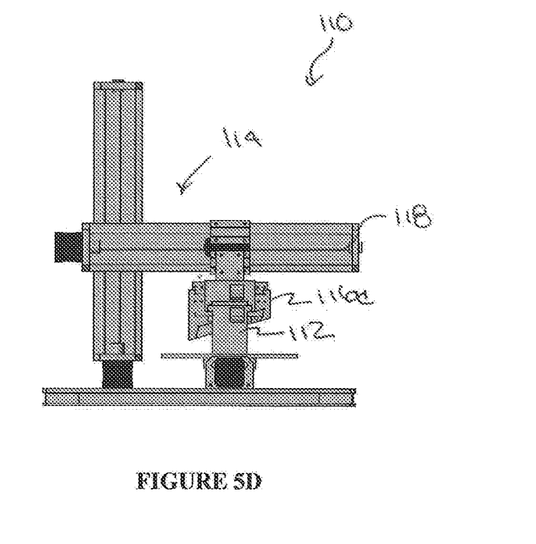

The trimming device 114 may comprise, for example, one or more blades 116a, 116b, and 116c for trimming each heat-sealed side 207 and front edge 209 of the covers or pouches 204 (FIG. 2), respectively. The blades 116a and 116b are side blades configured to cut the cover or pouch 204 substantially close to its heat-sealed sides 207 as the object 200 is moved along path 12, thereby trimming the same. Blade 116c is a front blade configured to cut the front edge 209 (FIG. 2) of cover 204. In a preferred embodiment, blades 116a and 116b extend outwardly from the blade 116c toward the incoming object 200 and generally parallel with the object's sides 207, such that the blades 116a and 116b have a downward angle or angled cutting edge to assist with cutting the sides 207 of the object's cover 204, as seen in FIGS. 5A and 5C. Blade 116c may be larger than blades 116a and 116b and may be generally normal to the blades 116a and 116b, as seen in FIG. 5B. Blade 116c may also be angled downward such that it has an angled cutting edge to facilitate cutting of the front end or edge 209 of the cover 204, as seen in FIGS. 5B and 5D. The blades may be made of a very hard material, such as non-conductive material, like industrial grade sapphire or the like, or a hard ceramic, like cubic boron nitride or carbon nitrides. Although the use of blades is preferred for trimming the cover 204, any known cutting device may be used for trimming the object's cover 204, such as band saws, saber saws, coping saws, sword saws, discs, or the like.

Figure 5E:
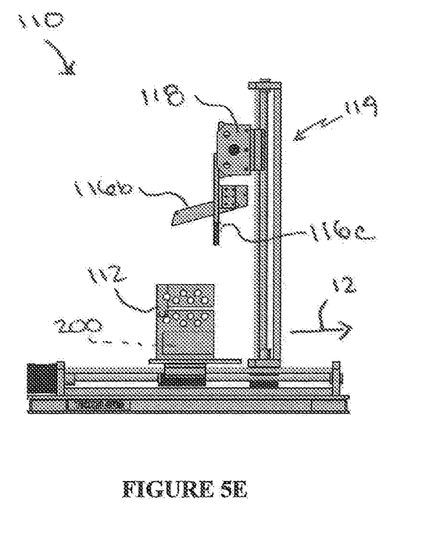
Figure 5F:
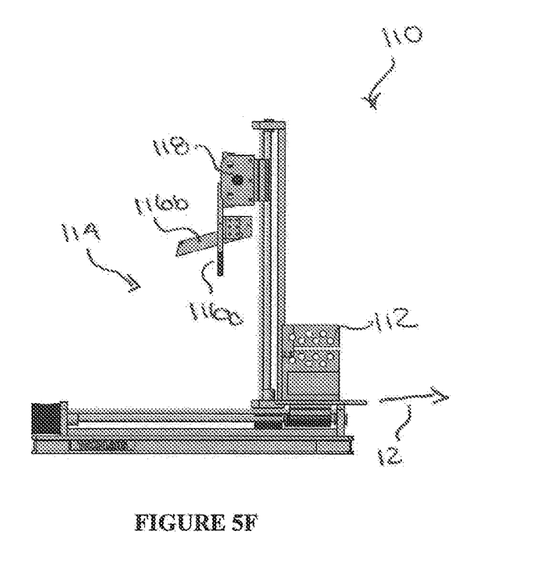

The blades 116a, 116b, and 116c are supported by a movable arm support 118 that may move up and down as needed, as seen in FIGS. 5C-5F. Once the object 200 arrives at the trimming device 114, the blades 116a, 116b, and 116c are moved downwardly, via movable arm support 118, over and past the object 200, thereby trimming the heat-seal sides 207 and the front end or edge 209 of the cover 204 (FIG. 2), respectively, as seen in FIGS. 5C and 5D. After trimming, the blades 116a, 116b, and 116c then move upwards back to their original position, as seen in FIG. 5E, and the object 200 continues along the transport path 12 past the trimming device 114, as seen in FIG. 5F, for transport to station 120.

Figures 6A, 6B:
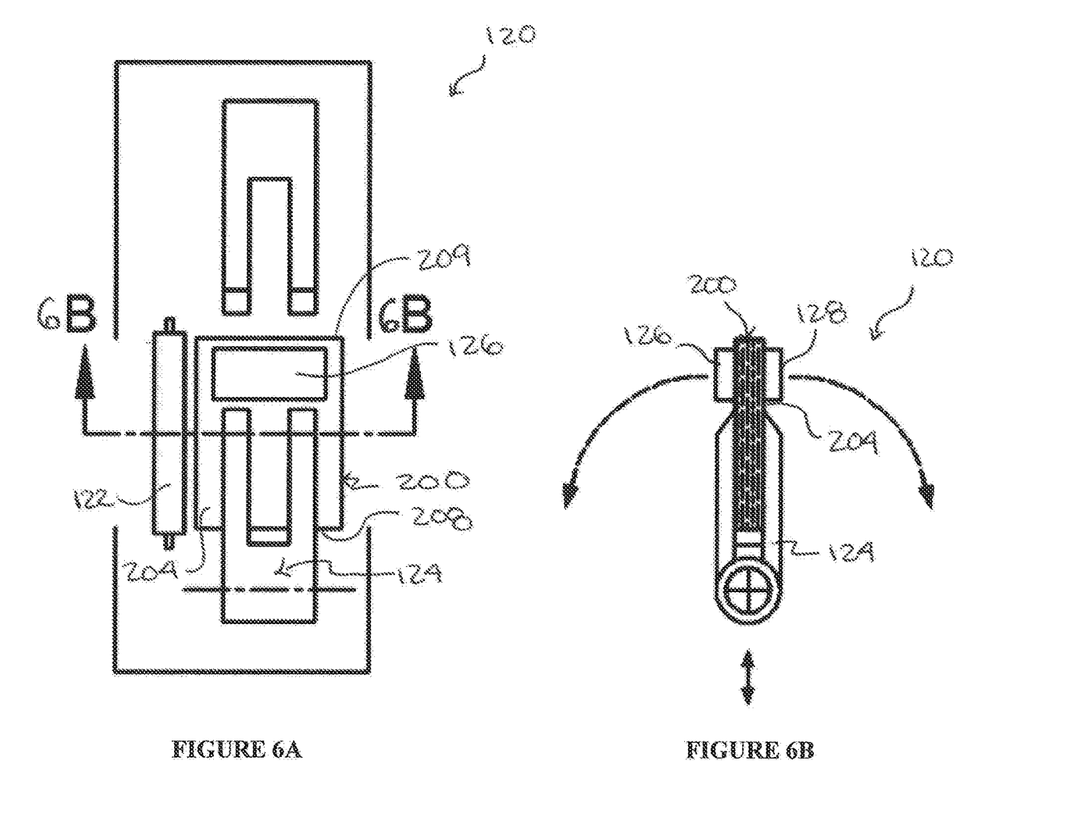
FIGS. 6A-6E are various views of an object cover removal station of the system and method illustrated in FIGS. 1A and 1B.

FIGS. 6A-6E show the cover removal station 120. FIG. 6A shows a top view of station 120 and object 200 with its now trimmed pouch 204. Movable, articulated and powered rollers 122 may transport the object 200 from station 110 into a grasping position with respect to a gripper 124 of station 120. Gripper 124 grips a portion of the object 200 along its folded edge 208, opposite the front trimmed edge 209. The gripper 124 may have, for example, two arms that open and close with respect to one another that hold the object 200 therebetween. Another portion of the object 200 is grasped by one or more moveable grasping members 126 and 128, such as movable vacuum devices connected to a vacuum source (not shown), like vacuum chucks or suction cups, that are preferably arcuate to the faces of the object. The vacuum devices 126 and 128 may grasp opposite faces, respectively, of the cover 204.

Figure 6C:
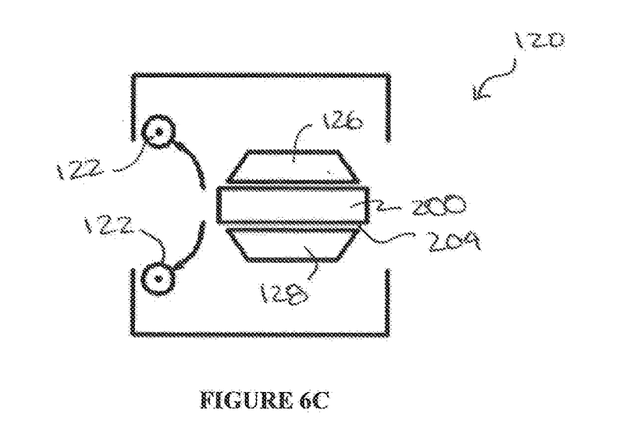

FIG. 6C is a front view of FIG. 6A of the removal station 120. The articulated movable rollers 122 are shown with their general paths by arrows. These rollers 122 can be moved away from the object 200 so that vacuum devices 126 and 128 can grasp a larger portion of the opposite faces, respectively, of the cover 204 of the object 200 without constraint from the rollers 122.

Figure 6D:
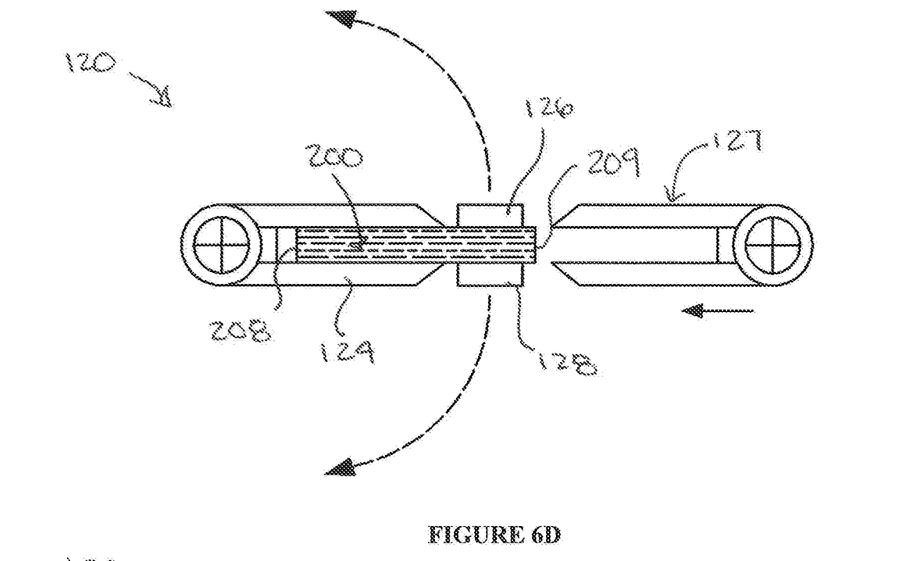
Figure 6E:
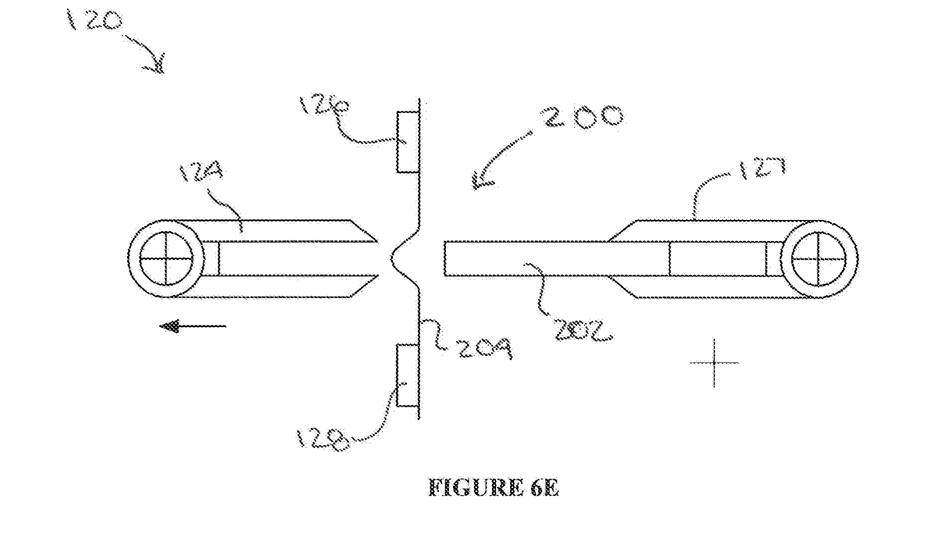

FIGS. 6D and 6E are side views of station 120 that show another gripper 127 configured to move towards the front trimmed edge 209 of the object 200. While gripper 124 holds the object 200 at its folded edge 208, the vacuum devices 126 and 128 move to positions away from one another (as seen by arrows in FIGS. 6B and 6D), thereby opening the trimmed front edge 209 (FIG. 2) of the cover 204. The gripper 127 then grasps the electrode stack 202 therein through the now opened cover 204 when the vacuum devices 126 and 128 peeled back the sides of the cover or pouch 204. The gripper 127 may, for example, have two arms that hold the object's stack 202 therebetween. At this time, the arms of the first gripper 124 open and the gripper 124 moves away from the object 200 and vacuum devices 126 and 128 move to a fully open position (FIG. 6E), thereby pulling the pouch 204 away from the object's stack 202 that is being grasped by the gripper 127. The object's stack 202 can now be moved along the transport path 12 and the vacuum devices 126 and 128 can be turned off, releasing the cover 204 to a waist area. If gravity is not preferred for collecting the covers, the vacuum devices can be moved to another position for disposal of the cover 204.

Figure 7A:
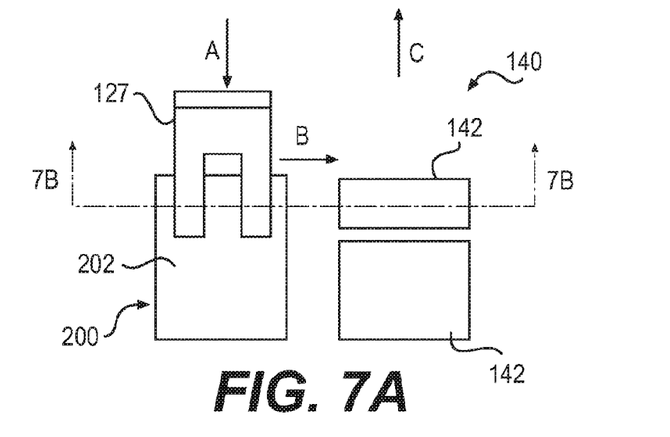
FIGS. 7A-7C are top, front, and side views, respectively, of a loading station of the system and method illustrated in FIGS. 1A and 1B.
Figure 7B:
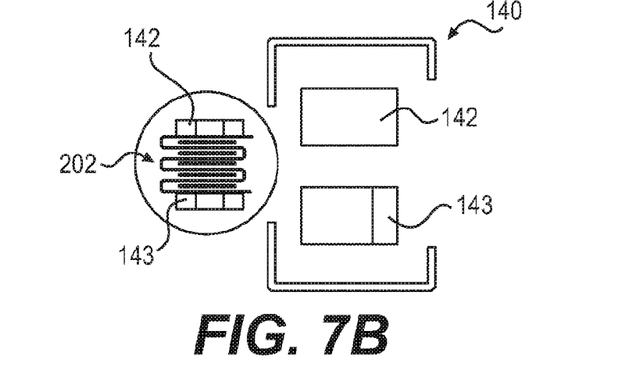
Figure 7C:
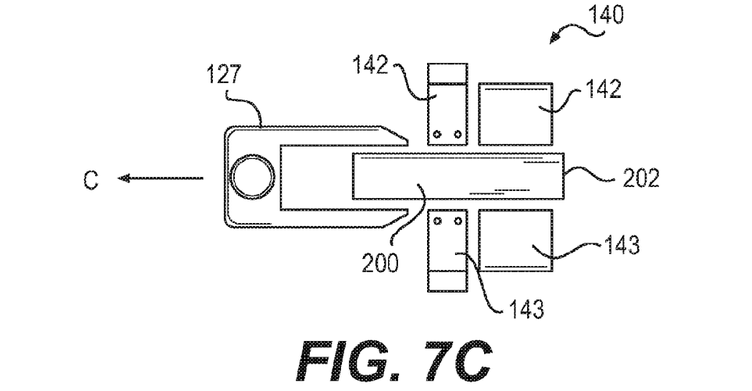

Referring to FIGS. 7A-7C, the loading station 140 is shown. From station 120, gripper 127 holds the object's stack 202. As seen in the top view of FIG. 7A, gripper 127 is configured to move into several positions A, B, and C. In the first position A, the gripper 127 is located on the transport path prior to object grasping devices 142 and 143, such as one or more upper vacuum devices 142 and one or more lower vacuum devices 143. The vacuum devices 142 and 143 may be vacuum chucks or suction cups, for example, connected to a vacuum source. Gripper 127 then moves to the second position B along the transport path to place the object's stack 202 in the reach of vacuum devices 142 and 143. One of the vacuum devices 142 and one of the vacuum devices 143 may then move to grasp the object's stack 202 at which point the gripper 127 releases the object's stack 202 and moves to third position C away from the transport path. One of the vacuum devices 142 and one of the vacuum devices 143 may then grasp the remaining portion of the object's stack 202, as seen in FIG. 7C, for loading in station 150 or 160.

Figure 8A:
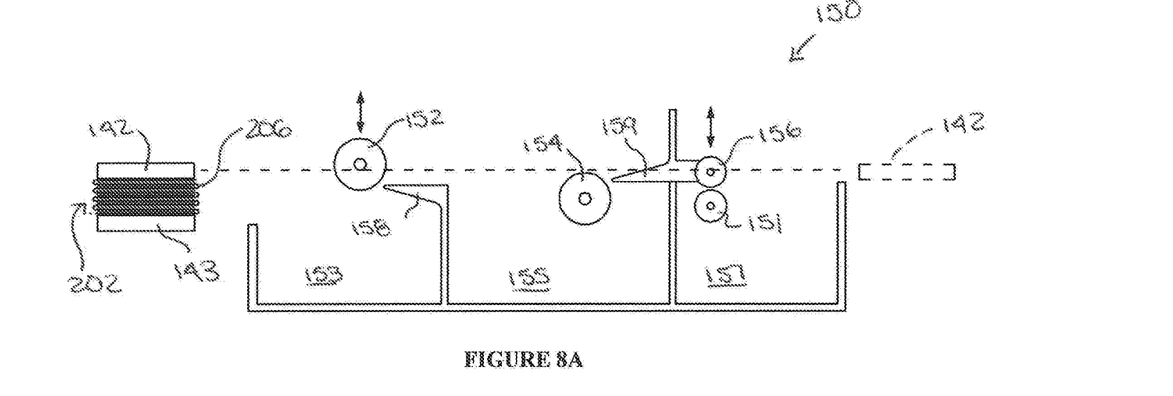
FIG. 8A is an elevational view of an exemplary reclamation station of the system and method illustrated in FIGS. 1A and 1B.

Referring to FIG. 8A, the reclamation station 150 is shown which is configured for processing object stacks 202 that are the serpentine-wound type (FIG. 3A) to extract recyclable electrodes therefrom, such as anode and cathode layers 203 and 205. The individual stack 202 may be loaded into station 150 via upper and lower vacuum devices 142 and 143 from station 140. Lower vacuum devices 143 are preferably stationary while the upper vacuum devices 142 are movable from the beginning of station 150 to its end. The path of the vacuum devices 142 may not be only horizontal, as shown, but may have jogs and curves according to the embodiment desired. Driven rollers 152, 154, and 156 are positioned along the object's transport path and correspond to collection areas 153, 155, and 157, respectively. To accommodate the movement of the vacuum devices 142 and the unfolding of the separator web 206, driven rollers 152 and 156 may be moved vertically up and down, as shown by arrows in FIG. 8A, until the vacuum devices 142 reach the end of the station 150 (right side in FIG. 8A). The rollers 152 and 156 may be moved up to allow the separator 206 (and vacuum devices 142) to extend underneath the rollers 152 and 156 and extend over the roller 154 therebetween as the web 206 is being unfolded. The rollers 152 and 156 can then be moved downwardly to their original position. As a result, the unfolded separator web 206 may weave under the first roller 152, over the second roller 154, and under the third roller 156. It will be appreciated that any number of rollers may be employed to support the unfolding of the web 206.

Vacuum devices 142 are activated during their movement so that the they grasp the separator web 206 from the top of the object's stack 202 and pulls it in a direction toward the end of the station 150 (from left to right in FIG. 8A), to unfold the same towards one or more extraction devices 158 and 159. As the web 206 passes the first driven roller 152, the web 206 engages a first extraction device 158, such as a skiving blade, such that any electrodes adhering to the underside of the web 206, such as anode layer 203 (FIG. 3A), are removed and dropped into the first collection area 153. When the vacuum devices 142 pass under the initial movable driven roller 152, the roller 152 may descend to form a relatively small clearance with the extraction device or skiving blade 158. Alternatively, roller 152 can be dropped lower than the top of the blade 158 to form a tortuous path thus urging the electrodes to separate from the web 206. Similarly, as vacuum device 142 passes over the stationary roller 154, the web 206 engages another extraction device 159, such as another skiving blade, such that any electrodes adhering to the topside of the web 206, such as cathode layer 205 (FIG. 3A), are removed and dropped in the second collection area 155. The roller 156 may be lowered to form a relatively small clearance with roller 153 and with the web 206 therebetween. Optionally, the extraction device or skiving blade 159 nearest roller 153 can descend to form a tortuous path thus urging the electrodes on the top of the web 206 to gather above second collection area 155. When descended, roller 156 is preferably in forcible contact with a yet another roller 151 to cause the separator web 206 to move from the stack 202 when actuated. At this point, the vacuum device 142 can release the end of the separator web 206 and allow the web 206 to drop into the third collection area 157 for later disposal of the web.

Figure 8B:
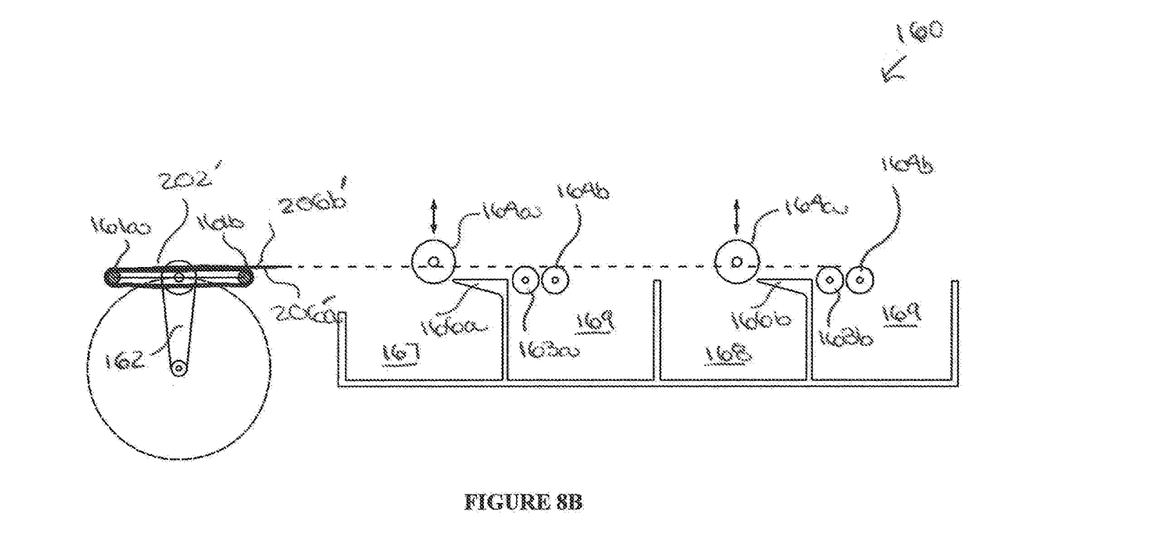
FIG. 8B is an elevation view of another exemplary reclamation station of the system and method illustrated in FIGS. 1A and 1B.

Referring to FIG. 8B, reclamation station 160 is configured for processing object stacks 202' that are the spiral-wound type (FIG. 3B), to extract electrodes therefrom. Loading station 140 has prepared the spiral wound stacks 202' for unreeling at the reclamation station 160. One or more movable mandrels 161a and 161b may be used to impale the object's stack 202', which is held by the gripper 127, preferably generally in the center of the spiral. The spacing of mandrels 161a and 161b may be such that they locate just inside of the curved parts of the spiral. Any known mechanism 162 may be used which causes the mandrels 161a and 161b to move along a path at a generally constant speed that facilitates the unreeling action of the object's stack 202'. Alternatively, the individual spiral wound stacks 202' may be manually loaded and positioned into the station 160 rather than using mandrels 161a and 161b.

Once the stack 202' is loaded in station 160, either by moveable mandrels 161a and 161b or by being manually positioned, an operator may grasp the separator webs 206' of the stack 202'. As shown in FIG. 3B, the spiral wound stack 202' has more than one separator web 206a' and 206b'. At the start of the loading operation, movable upper driven rollers 164a and movable lower driven rollers 164b can be moved upwards to provide clearance for the operator's fingers and hands. The separator webs can then be pulled toward the end of the station 160 (to the right in FIG. 8B) with the lowest of the separator webs 206a' being threaded over a first fixed driven roller 163a and the upper separator web 206b' being threaded over a second fixed driven roller 163b. Then the rollers 164a and 16b can be moved downwards to be positioned adjacent extraction devices 166a and 166b, such as one or more skiving blades, respectively. The rollers 164a and 164b may be lowered to form a relatively small clearance with rollers 163a and 163b, respectively, with the webs 206' therebetween. Optionally, the rollers 164a and 164b can descend to form a tortuous path in the same manner as described regarding station 150. The lower rollers 164b may be positioned adjacent rollers 163a and 163b, respectively, such that they fit forcibly together with the web 206' therebetween. In this way, when all rollers are driven, the webs 206' move together carrying the electrodes (anodes 203 and cathodes 205) positioned between them.

As the rollers are driven, the lower separator 206a' engages the first extraction device 166a such that the electrodes thereon, such as anode layer 203 (FIG. 3B), are removed and dropped into a first collection area 167 and the upper separator 206b' engages the second extraction device 166b such that the electrodes thereon, such as cathode layer 205 (FIG. 3B), are removed and dropped into a second collection area 168. Areas 169 may be provided after each of the first and second collection areas 167 and 168 for storing and later discarding the separator webs 206a' and 206b'.

For both stations 150 and 160, any number of rollers and or extraction devices may be used as desired depending on the number of electrode layers and/or the number of separator webs in each stack. And although skiving blades are preferred for removing the electrodes, other devices or mechanisms may be used, such as a reverse-running roller to urge the electrodes away from the separator web. The collection areas may be configured with conveyors to direct the electrodes to areas for further storage or processing. Also, the stations 150 and 160 station may be inclined to assist with collection of the electrodes. A solvent washing may be incorporated into stations 150 and 160 to remove residual electrolyte.

While particular embodiments have been chosen to illustrate the invention, it will be understood by those skilled in the art that various changes and modifications can be made therein without departing from the scope of the invention as defined in the appended claims. Although each station of the system 10 preferably has its own environmentally sealed inert enclosure, the enclosures of the stations can be combined into a single enclosure with airlocks. Also, grippers 124 and 127 are shown as generally rectangular where it grasps the stack 202, as are vacuum devices 142 and 143; however their specific geometry can be varied to be interdigitated or angularly shaped in other embodiments.

What is claimed is:

1. A system for extracting recyclable material from an object, comprising:
    a first station for receiving at least one object, the at least one object having recyclable material received in a cover, and the cover being sealed;
    a second station in communication with the first station to receive the at least one object therefrom and configured to prepare the cover of the at least one object for removal therefrom;
    a third station in communication with the second station to receive the at least one object therefrom and configured to remove the cover from the at least one object;
    a fourth station in communication with the third station to receive the at least one object with the cover removed and configured to position the at least one object for loading; and
    a fifth station in communication with the fourth station to receive the at least one object therefrom, the fifth station including one or more extraction devices configured to engage the at least one object and remove the recyclable material therefrom and at least one collection area for receiving the removed recyclable material,
    wherein the object is one or more battery cells and the recyclable material is electrodes supported by at least one separator web, and
    wherein the fifth station includes at least one movable roller and at least one stationary roller for unfolding or unreeling the at least one separator web.

2. The system of claim 1, wherein each of the first, second, third, fourth, and fifth stations has an enclosure with an inert environment for receiving the object.

3. The system of claim 1, wherein the fifth station includes another collection area for receiving the at least one separator web for disposal.

4. The system of claim 1, wherein the one or more extraction devices is a blade configured for removing the electrodes from the at least one separator web.

5. The system of claim 1, wherein the at least one separator web is a serpentine separator web with the electrodes attached opposite sides thereof.

6. The system of claim 1, wherein the at least one separator includes a plurality of separator webs with the electrodes attached thereto and wound in a generally spiral configuration.

7. The system of claim 1, further comprising a transport mechanism for moving the at least one object sequentially from the first station to the fifth station.

8. The system of claim 1, wherein the second station includes one or more trimming devices configured to trim sides of the cover of the at least one object.

9. The system of claim 8, wherein the third station includes one or more grasping members configured to grasp opposite faces of the cover and remove the cover from the at least one object.

10. The system of claim 9, wherein the one or more trimming devices are one or more blades and the one or more grasping members are one or more movable vacuum devices.

11. The system of claim 9, wherein the one or more trimming devices include first and second side blades extending from a front blade, each of the first and second side blades and the front blade being angled to have an angled cutting edge.

12. The system of claim 11, wherein the cover has a folded end and a sealed end opposite the folded end and first and second sealed sides extending therebetween, and the first and second side blades being configured to cut the first and second sealed sides of the cover and the front blade being configured to cut the front end of the cover.

13. The system of claim 12, wherein the first and second side blades and the front blade are supported by a movable support arm.

14. The system of claim 1, wherein the fourth station includes a gripper configured to grip the at least one object.

15. The system of claim 13, wherein the gripper is movable between different positions in the fourth station.

16. The system of claim 14, wherein the fourth station includes one or more grasping members configured to grasp the at least one object for loading in the fifth station.

17. The system of claim 16, wherein in the fifth station, one of the one or more grasping members is movable and another of the one or more grasping members is stationary.

18. The system of claim 17, wherein the one or more grasping members are vacuum devices.

19. A system for extracting recyclable material from an object, comprising:
    a first station for receiving at least one object, the at least one object having recyclable material received in a cover, and the cover being sealed;
    a second station in communication with the first station to receive the at least one object therefrom and configured to prepare the cover of the at least one object for removal therefrom;
    a third station in communication with the second station to receive the at least one object therefrom and configured to remove the cover from the at least one object;
    a fourth station in communication with the third station to receive the at least one object with the cover removed and configured to position the at least one object for loading; and
    a fifth station in communication with the fourth station to receive the at least one object therefrom, the fifth station including one or more extraction devices configured to engage the at least one object and remove the recyclable material therefrom and at least one collection area for receiving the removed recyclable material,
wherein the second station includes one or more trimming devices configured to trim sides of the cover of the at least one object,
wherein the third station includes one or more grasping members configured to grasp opposite faces of the cover and remove the cover from the at least one object, and
wherein the one or more trimming devices include first and second side blades extending from a front blade, each of the first and second side blades and the front blade being angled to have an angled cutting edge.

* * * * *